United States Patent [19]

Yoon et al.

[11] Patent Number: 4,867,538
[45] Date of Patent: Sep. 19, 1989

[54] ORGANIC NONLINEAR OPTICAL MEDIA

[75] Inventors: Hyun-Nam Yoon, New Providence; Thomas M. Leslie, Clinton Township, Hunterdon County; Ronald N. DeMartino, Wayne, all of N.J.

[73] Assignee: Hoechst Celanese Corp., Somerville, N.J.

[21] Appl. No.: 28,352

[22] Filed: Mar. 20, 1987

[51] Int. Cl.$^4$ .................. G02F 1/13; G09K 19/52
[52] U.S. Cl. ................... 350/350 R; 252/299.01
[58] Field of Search ........... 252/299.01, 299.6, 299.66, 252/299.62; 350/350 R

[56] References Cited

U.S. PATENT DOCUMENTS

| | | | |
|---|---|---|---|
| 4,293,435 | 10/1981 | Portugall et al. | 252/299.01 |
| 4,358,391 | 11/1982 | Finkelmann et al. | 252/99.67 X |
| 4,388,453 | 6/1983 | Finkelmann et al. | 252/299.6 X |
| 4,640,800 | 2/1987 | Choe et al. | 544/292 X |
| 4,694,066 | 9/1987 | DeMartino et al. | 528/403 X |
| 4,709,030 | 11/1987 | Petrzilka et al. | 350/350 R X |

FOREIGN PATENT DOCUMENTS 172517 2/1986 European Pat. Off. ....... 252/249.66

OTHER PUBLICATIONS

Meredith et al., *Macromolecules*, vol. 15, pp. 1385–1389.

Primary Examiner—Stephen J. Kalafut
Attorney, Agent, or Firm—DePaoli & O'Brien

[57] ABSTRACT

In one embodiment this invention provides a light switch or light modulator device having a nonlinear optical component which is a blend of organic constituents exhibiting nonlinear optical response.

Illustrative of the organic nonlinear optical component is a transparent film consisting of a blend of (1) a host thermotropic liquid crystalline polymer such as:

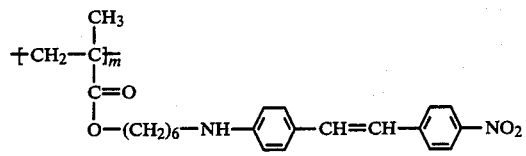

and (2) an organic compound such as:

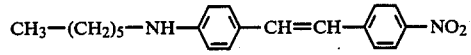

11 Claims, No Drawings

ORGANIC NONLINEAR OPTICAL MEDIA

This invention was made with Government support under Contract Number F49620-84-C-0110 awarded by the Department of Defense. The Federal Government has certain rights in this invention.

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second order nonlinearities in combination with electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above recited publications are incorporated herein by reference.

Of general interest with respect to the present invention embodiments is prior art relating to side chain liquid crystalline polymers, such as the five articles published on pages 275–368 of "Polymeric Liquid Crystals", edited by A. Blumstein (Plenum Publishing Corporation, New York, 1985).

U.S. Pat. No. 4,293,435 describes liquid crystalline polymers corresponding to the formula:

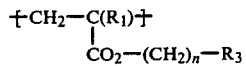

where $R_1$ is hydrogen or methyl, n is an integer from 1 to 6, and $R_3$ represents a structural element containing at least two phenylene groups.

Makromol, 179, 2541(1978) by H. Finkelmann et al describes a model consideration for liquid crystalline polymers with biphenyl groups as mesogenic entities.

J. Polym. Sci., 19, 1427(1981) by Paleos et al describes the synthesis of liquid crystalline polymers which are prepared by the interaction of poly(acryloyl chloride) with mesogenic compounds such as p-aminobiphenyl.

Eur. Polym. J., 18, 651(1982) describes comb-like liquid crystalline polymers of the smectic and nematic types with cyanobiphenyl groups in the side-chain:

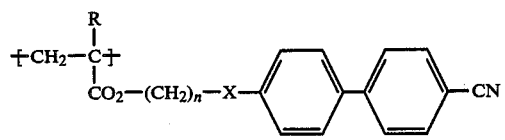

where R is hydrogen or methyl, n is an integer of 2–11, and X is an oxy, alkylene or carbonyloxy divalent radical.

Other publications which describe thermotropic liquid crystalline polymers with side chain induced crystallinity include Polymer, 25, 1342(1984); Eur. Polym. J., 21, No. 7, 645(1985); Polymer, 26, 615(1985); and references cited therein.

Of more specific interest with respect to the present invention embodiments is Angew. Chem. Int. Ed. Engl., 23, 690(1984) by D. J. Williams which describes guest/host blends, such as a liquid crystalline polymer doped with p-dimethylaminonitrostilbene and molecularly aligned with an external DC electric field.

The above listed publications are incorporated herein by reference.

There is continuing interest in the theory and practice of liquid crystalline polymers which are characterized by a comb-like mesogenic side chain structure.

There is also an increasing research effort to develop new nonlinear optical organic systems for prospective novel phenomena and devices adapted for light switching and light modulation, information control in optical circuitry, and optical communications. The potential utility of organic materials with large second order and third order nonlinearities for very high frequency application contrasts with the bandwidth limitations of conventional inorganic electrooptic materials.

Accordingly, it is an object of this invention to provide novel transparent organic optical media which exhibit nonlinear optical response.

It is another object of this invention to provide transparent nonlinear optical media which comprise a host thermotropic liquid crystalline polymer having mesogenic side chains which exhibit nonlinear optical response, and a guest organic compound which exhibits nonlinear optical response.

It is a further object of this invention to provide light switch and light modulator devices with a transparent organic nonlinear optical component comprising a host thermotropic side chain liquid crystalline polymer and a guest organic compound which respectively exhibit nonlinear optical response.

Other objects and advantages of the present invention shall become apparent from the accompanying description and examples.

The present patent application has subject matter related to the disclosure of copending patent application Ser. No. 748,583, filed June 25, 1985; patent applications Ser. Nos. 822,092; 822,093; and 822,094, filed Jan. 24, 1986, respectively; patent application Ser. No. 898,982, filed Aug. 22, 1986; and patent application Ser. No. 915,179, filed Oct. 3, 1986.

DESCRIPTION OF THE INVENTION

One or more objects of the present invention are accomplished by the provision of a nonlinear optical medium in the form of a transparent solid comprising (1) a host thermotropic liquid crystalline polymer component having a comb structure of mesogenic sidechains which comprise at least about 25 weight percent of the polymer, wherein the polymer has a glass transition temperature above about 40° C., and the mesogens exhibit nonlinear optical response; and (2) a guest organic compound component which has a molecular weight of less than about 1000, and which exhibits nonlinear optical response.

The guest organic compound component will comprise about 5–30 weight percent of the total weight of components in the optical medium.

The main chain of the host liquid crystalline polymer component can consist of structures such as polyvinyl, polysiloxane, polyoxyalkylene, polyester, polyamide, and the like.

The liquid crystalline polymer component typically will exhibit a smectic or nematic mesophase.

Illustrative of a preferred nonlinear optical medium is one in which the organic compound component and the sidechain mesogens of the liquid crystalline polymer component respectively exhibit a second order nonlinear optical susceptibility $\beta$ of at least about $5 \times 10^{-30}$ esu, or exhibit a third order nonlinear optical susceptibility $\gamma$ of at least about $1 \times 10^{-36}$ esu as measured at 1.91 μm excitation wavelength.

A preferred nonlinear optical medium of the present invention will exhibit a second order nonlinear optical susceptibility $\chi^{(2)}$ of at least about $1 \times 10^{-6}$ esu, or exhibit a third order nonlinear optical susceptibility $\chi^{(3)}$ of at least about $1 \times 10^{-9}$ esu, as measured at 1.91 μm excitation wavelength.

In another embodiment this invention provides a nonlinear optical medium as defined above in which the organic compound component is a quinodimethane composition corresponding to the formula:

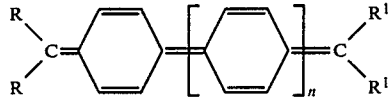

where R and $R^1$ are substituents selected from hydrogen and aliphatic, alicyclic and aromatic groups containing between about 1–20 carbon atoms; n is an integer with a value between about 1–3; and at least one of the R substituents is an electron-donating group, and at least one of the $R^1$ substituents is an electron-withdrawing group.

Illustrative of quinodimethane corresponding to the above formula are compounds with the following structures:

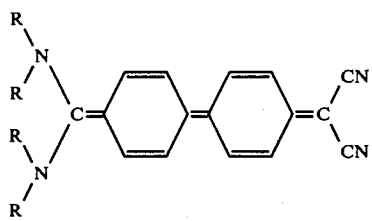

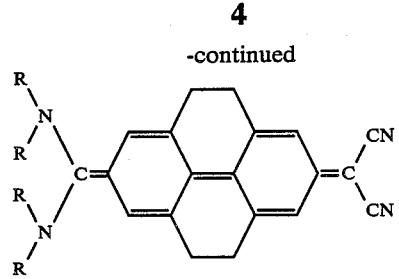

where R is a substituent selected from hydrogen and alkyl groups.

In another embodiment this invention provides a nonlinear optical medium as defined above in which the organic compound component is a naphthoquinodimethane composition corresponding to the formula:

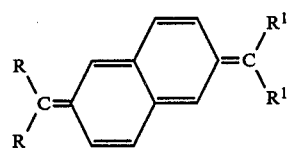

where R and $R^1$ are substituents selected from hydrogen and aliphatic, alicyclic and aromatic groups containing between about 1–20 carbon atoms, and at least one of the R substituents is an electron-donating group, and at least one of the $R^1$ substituents is an electron-withdrawing group.

Illustrative of quinodimethanes corresponding to the above formula are compounds with the following structure:

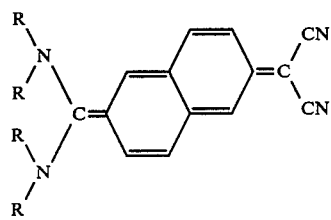

where R is a substituent selected from hydrogen and alkyl groups.

Preferred quinodimethane type compounds utilized as a component in the nonlinear optical media include 13,13-diamino-14,14-dicyanodiphenoquinodimethane; 13,13-di(dimethylamino)-14,14-dicyanodiphenoquinodimethane; 13,13-di(diethylamino)-14,14-dicyanodiphenoquinodimethane; 13,13-di(n-hexadecylamino)-14,14-dicyanodiphenoquinodimethane; 13,13-diamino-14,14-dicyano-4,5,9,10-tetrahydropyrenoquinodimethane; 13,13-di(dimethylamino)-14,14-dicyano-4,5,9,10-tetrahydropyrenoquinodimethane; 13,13-di(diethylamino)-14,14-dicyano-4,5,9,10-tetrahydropyrenoquinodimethane; 13,13-di(n-hexadecylamino)-14,14-dicyano-4,5,9,10-tetrahydropyrenoquinodimethane; 13,13-ethylenediamino-14,14-dicyanodiphenoquinodimethane; 13,13-ethylenediamino-14,14-dicyano-4,5,9,10-tetrahydropyrenoquinodimethane; 11,11-diamino-12,12-dicyano-2,6-naphthoquinodimethane; 11,11-di(n-butylamino)-12,12-dicyano-2,6-naphthoquinodimethane; and 11,11-di(n-nexadecylamino)-12,12-dicyano-2,6-naphthoquinodimethane.

In another embodiment this invention provides a nonlinear optical medium in the form of a transparent solid comprising (1) a host thermotropic liquid crystalline polymer component which is characterized by a recurring monomeric unit corresponding to the formula:

where P is a polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 $\mu$m excitation wavelength, and where the pendant mesogens comprise at least about 10 weight percent of the polymer, and the polymer has a glass transition temperature above about 40° C.; and (2) a quest organic compound component which has a molecular weight less than about 1000, and which exhibits a second order nonlinear optical susceptibility $\beta$ of at least about $5 \times 10^{-30}$ esu as measured at 1.91 $\mu$m excitation wavelength; wherein the optical medium is characterized by an external field-induced orientation of aligned molecules.

In another embodiment this invention provides a nonlinear optical medium in the form of a transparent solid comprising (1) a host thermotropic liquid crystalline polymer component which is characterized by a recurring monomeric unit corresponding to the formula:

where P is a polymer main chain unit, S is a flexible spacer group having a linear chain length of between about 0-20 atoms, M' is a pendant mesogen which exhibits a third order nonlinear optical susceptibility $\gamma$ of at least about $1 \times 10^{-36}$ esu as measured at 1.91 $\mu$m excitation wavelength, and where the pendant mesogens comprise at least about 10 weight percent of the polymer, and the polymer has a glass transition temperature above about 40° C.; and (2) a quest organic compound component which has a molecular weight less than about 1000, and which exhibits a third order nonlinear optical susceptibility $\gamma$ of at least $1 \times 10^{-36}$ esu as measured at 1.91 $\mu$m excitation wavelength; wherein the optical medium is characterized by an external field-induced orientation of aligned molecules.

In another embodiment this invention provides a nonlinear optical medium in the form of a transparent solid comprising (1) a host thermotropic liquid crystalline polymer component which is characterized by a recurring monomeric unit corresponding to the formula:

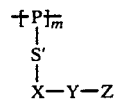

where P is a polymer main chain unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

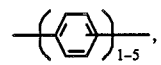

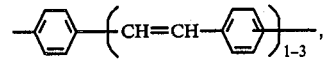

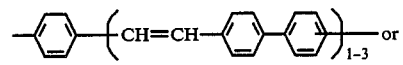

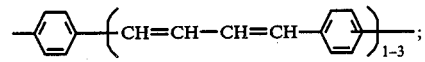

and

Z is an electron-donating group or an electron-withdrawing group; and (2) an organic compound component corresponding to the formula:

K—X—Y—Z where K is hydrogen or an organic radical; X, Y and Z correspond to groups as defined above; and the organic compound component has a molecular weight less than about 1000.

In another embodiment this invention provides a nonlinear optical medium in the form of a transparent solid comprising (1) a host thermotropic liquid crystalline polymer component which is characterized by a recurring monomeric unit corresponding to the formula:

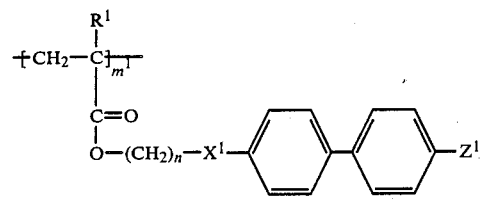

where $m^1$ is an integer of at least 5; n is an integer between about 4-20; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

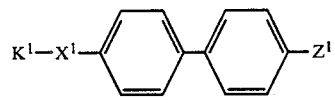

where $K^1$ is hydrogen or an organic radical containing between about 1-20 carbon atoms; and $X^1$ and $Z^1$ are groups as defined above.

In addition to the acrylate and methacrylate monomeric units represented in the polymer formula represented above, a polyvinyl main chain can contain one or more additional comonomeric units such as vinyl halide, vinyl carboxylate, alkene, alkadiene, arylvinyl, and the like. The comonomer species are exemplified by vinyl chloride, vinyl acetate, ethylene, propylene, isobutylene, 1-butene, isoprene, styrene, and the like.

In another embodiment this invention provides a nonlinear optical medium in the form of a transparent solid comprising (1) a host thermotropic liquid crystalline polymer component which is characterized by a recurring monomeric unit corresponding to the formula:

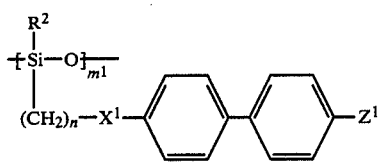

where $R^2$ is a $C_1$-$C_{10}$ hydrocarbyl group; $m^1$ is an integer of at least 5; n is an integer between about 4–20; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

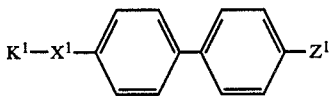

where $K^1$ is hydrogen or an organic radical containing between about 1-20 carbon atoms; and $X^1$ and $Z^1$ are groups as defined above.

In another embodiment this invention provides a nonlinear optical medium in the form of a transparent solid comprising (1) a host thermotropic liquid crystalline polymer component which is characterized by a recurring monomeric unit corresponding to the formula:

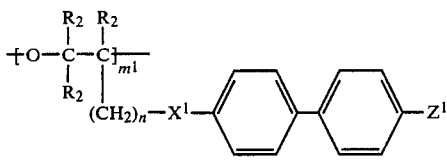

where $R^2$ is hydrogen or a $C_1$-$C_4$ alkyl group; $m^1$ is an integer of at least 5; n is an integer between about 4–20; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

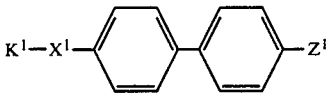

where $K^1$ is hydrogen or an organic radical containing between about 1-20 carbon atoms; and $X^1$ and $Z^1$ are groups as defined above.

In another embodiment this invention provides a nonlinear optical medium in the form of a transparent solid comprising (1) a host thermotropic liquid crystalline polymer component which is characterized by a recurring monomeric unit corresponding to the formula:

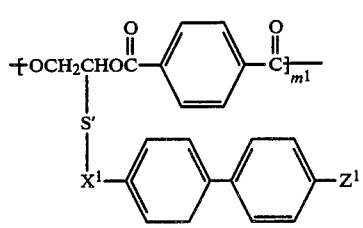

where $m^1$ is an integer of at least 5; S' is a flexible spacer group having a linear chain length of between about 1-25 atoms; $X^1$ is —$NR^1$, —O— or —S—; $R^1$ is hydrogen or methyl; and $Z^1$ is —$NO_2$, —CN or —$CF_3$; and (2) an organic compound component corresponding to the formula:

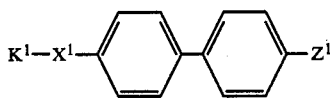

where $K^1$ is hydrogen or an organic radical containing between about 1-20 carbon atoms; and $X^1$ and $Z^1$ are groups as defined above.

In another embodiment this invention provides a nonlinear optical medium in the form of a transparent solid comprising (1) a host thermotropic liquid crystalline polymer component which is characterized by a recurring monomeric unit corresponding to the formula:

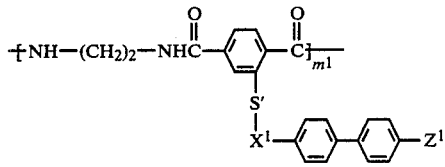

where $m^1$ is an integer of at least 5; S' is a flexible spacer group having a linear chain length of between about 1-25 atoms; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

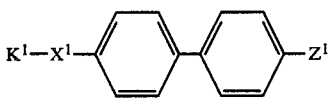

where $K^1$ is hydrogen or an organic radical containing between about 1-20 carbon atoms; and $X^1$ and $Z^1$ are groups as defined above.

In another embodiment this invention provides a light switch or light modulator device with an organic nonlinear optical component consisting of a transparent solid medium comprising a composition which is a blend of constituents comprising (1) a host thermotropic liqid crystalline polymer having a comb structure of mesogenic sidechains which comprise at least about 25 weight percent of the polymer, wherein the polymer has a glass transition temperature above about 40° C., and the mesogens exhibit nonlinear optical response; and (2) a guest organic compound which has a molecular weight of less than about 1000, and which exhibits nonlinear optical response.

In another embodiment this invention provides a light switch or light modulator device with an organic nonlinear optical component consisting of a transparent solid medium comprising a thermoplastic composition which is a blend of constituents comprising (1) a host thermotropic liquid crystalline polymer which is characterized by a recurring monomeric unit corresponding to the formula:

where P is a polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 $\mu$m excitation wavelength, and where the pendant mesogens comprise at least about 10 weight percent of the polymer, and the polymer has a glass transition temperature above about 40° C.; and (2) a guest organic compound which has a molecular weight less than about 1000, and which exhibits a second order nonlinear optical susceptibility $\beta$ of at least about $5 \times 10^{-30}$ esu as measured at 1.91 $\mu$m excitation wavelength; wherein the optical medium is characterized by an external field-induced orientation of aligned molecules.

The term "transparent" as employed herein refers to an optical medium which is transparent or light transmitting with respect to incident fundamental light frequencies and created light frequencies. In a nonlinear optical device, a present invention nonlinear optical medium is transparent to both the incident and exit light frequencies.

The term "thermotropic polymer" as employed herein refers to a polymer which is liquid crystalline (i.e., anisotropic) in the melt phase.

The term "condensation polymer" as employed herein refers to a polyester or polyamide type polymer which generally is produced by covalent bond formation between reactants with the release of water or hydrohalide byproduct.

The term "electron-donating" as employed herein refers to organic substituents which contribute $\pi$-electron density when the conjugated electronic structure is polarized by the input of electromagnetic energy.

The term "electron-withdrawing" as employed herein refers to electronegative organic substituents which attract $\pi$-electron density when the conjugated electronic structure is polarized by the input of electromagnetic energy.

Illustrative of electron-donating groups are amino, alkyl, alkoxy, alkylthio, hydroxy, thiolo, acyloxy, vinyl, halo, and the like.

Illustrative of electron-withdrawing substituents are nitro, haloalkyl, cyano, acyl, alkanoyloxy, alkoxysulfonyl, and the like.

SYNTHESIS OF LIQUID CRYSTALLINE POLYMER COMPONENT

The preparation of a polyvinyl liquid crystalline polymer with mesogenic side chains is illustrated by the following flow diagram:

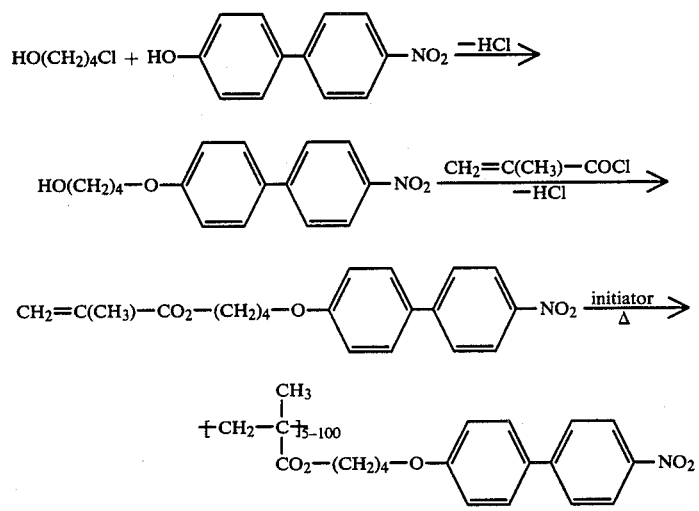

The preparation of a polysiloxane liquid crystalline polymer with mesogenic side chains is illustrated by the following flow diagram of a reaction between an organohydrogenpolysiloxane and a vinyl-substituted mesogenic compound:

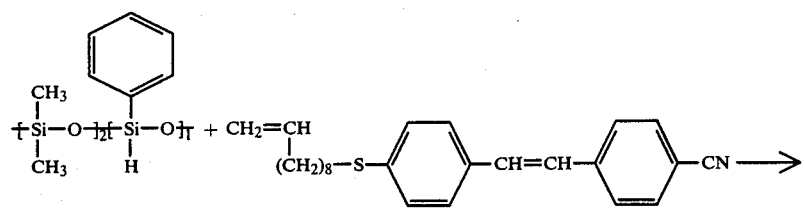

-continued

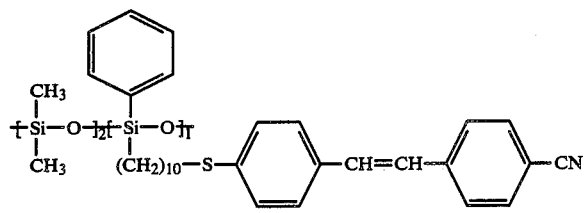

The average number of silicon atoms in the organopolysiloxane main chain can vary in the range between about 3–3000.

Polysiloxane liquid crystalline polymers with mesogenic side chains are described in U.S. Pat. Nos. 4,358,391; 4,388,453; and 4,410,570; and in publications such as Makromol. Chem., Rapid Commun. 3, 557(1982); and 5, 287(1984); incorporated herein by reference.

The preparation of a polyoxyalkylene liquid crystalline polymer with mesogenic side chains is illustrated by the following polymerization reaction:

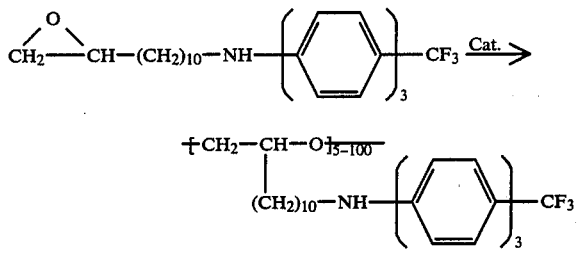

The preparation of a polyester liquid crystalline polymer with mesogenic side chains is illustrated by the following diagram:

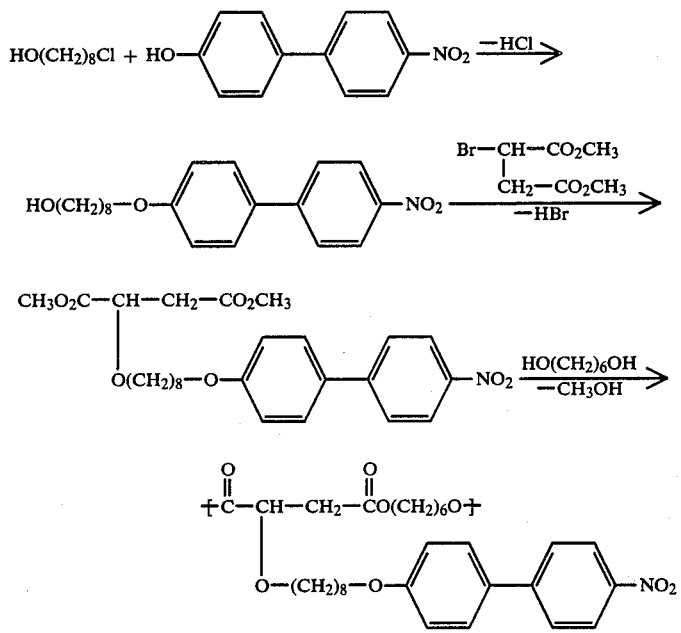

The preparation of a polyamide liquid crystalline polymer with mesogenic side chains is illustrated by the flow diagram:

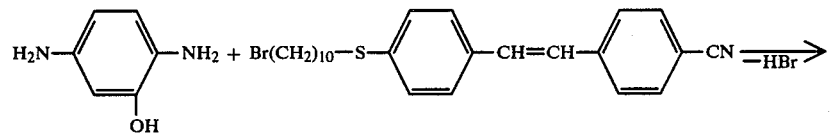

-continued

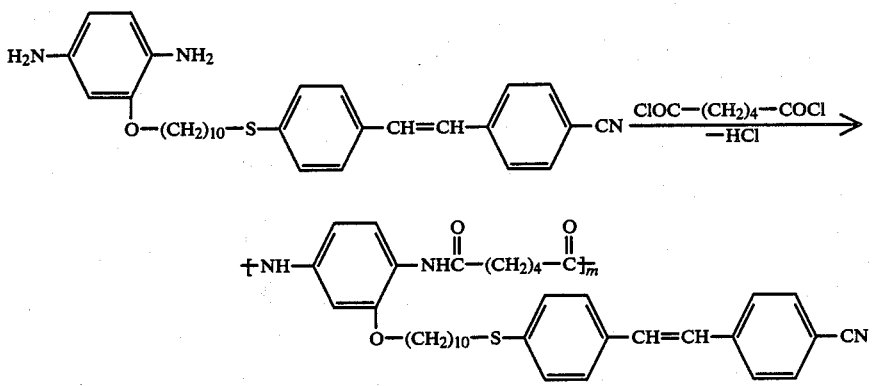

The types of reactants which can be employed in the illustrated synthesis are exemplified by the following general formulae:

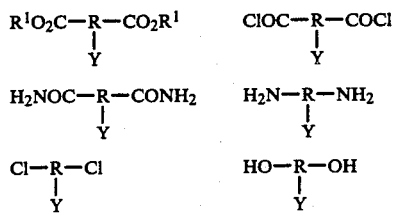

In the above illustrated formulae, R is selected from aliphatic, alicyclic and aromatic structures containing between about 1–20 carbon atoms, $R^1$ is hydrogen or an alkyl group, and Y is either hydrogen or a mesogenic side chain of the type previously described.

A present invention side chain liquid crystalline polymer typically has a weight average molecular weight between about 2000–200,000, and preferably has a glass transition temperature ($T_g$) in the range between about 40°–120° C.

Side chain liquid crystalline polymers are described in copending patent application Ser. No. 822,090, filed Jan. 24, 1986, incorporated by reference.

Side chain liquid crystalline condensation polymers are described in patent application Ser. No. 898,982, filed Aug. 22, 1986, incorporated by reference.

SYNTHESIS OF ORGANIC COMPOUND COMPONENT

As previously defined, the guest organic compound component of a present invention organic nonlinear optical medium has a molecular weight less than about 1000, and exhibits nonlinear optical response.

Illustrative of known organic compounds which can be employed are urea; stilene; p-dimethylaminonitrostilbene; 2-methyl-4-nitroaniline; 4-diethylamino-4'-nitrodiphenyl; 4-diethylamino-2-hydroxybenzylidene-4-nitroaniline; and the like.

The synthesis of diphenoquinodimethane and tetrahydropyrenoquinodimethane types of organic compound components are described in copending patent application Ser. No. 748,583, filed June 25, 1985, incorporated by reference.

The synthesis of the naphthoquinodimethane type of organic compound components are described in copending patent application Ser. No. 864,203, filed May 19, 1986, incorporated by reference.

In the preparation of a present invention nonlinear optical medium it is advantageous to select a guest organic compound component which has structural and functional features in common with the mesogenic sidechains of the host liquid crystalline polymer component.

One significant advantage of the similarity of structure and functionality between the guest organic compound component and the mesogenic sidechains of the host polymer is the increased quantity of the guest component that can be melt blended with the host component and then cooled to form a transparent solid medium.

For example, 4-diethylamino-2-hydroxybenzylidene-4-nitroaniline dye has a maximum solubility in poly(methyl methacrylate) of less than about 10 weight percent. In contrast, the same dye can be dissolved in a poly[6-(4-nitrobipheyloxy)hexyl methacrylate]polymer of the present invention in a quantity of 10 weight percent or more.

Another advantage of a similarity of structure and functionality between the guest compound and the mesogenic sidechains of the host polymer is the enhanced uniaxial molecular alignment which can be achieved with an applied external field. This results in an increased second order or third order nonlinear optical susceptibility as exhibited by an invention nonlinear optical medium.

NONLINEAR OPTICAL PROPERTIES

The fundamental concepts of nonlinear optics and their relationship to chemical structures can be expressed in terms of dipolar approximation with respect to the polarization induced in an atom or molecule by an external field.

As summarized in the ACS Symposium Series 233(1983) listed hereinabove in the Background Of The Invention section, the fundamental equation (1) below describes the change in dipole moment between the ground state $\mu_g$ and an excited state $\mu_e$ expressed as a power series of the electric field E which occurs upon interaction of such a field, as in the electric component of electromagnetic readiation, with a single molecule. The coefficient $\alpha$ is the familiar linear polarizability, $\beta$ and $\gamma$ are the quadratic and cubic hyperpolarizabilities, respectively. The coefficients for these hyperpolarizabilities are tensor quantities and therefore highly symmetry dependent. Odd order coefficients are nonvanishing for all structures on the molecular and unit cell level. The even order coefficients such as $\beta$ are zero for those structures having a center of inversion symmetry on the molecular and/or unit cell level.

Equation (2) is identical with (1) except that it describes a macroscopic polarization, such as that arising from an array of molecules in a liquid crystalline domain:

$$\Delta\mu = \mu_e - \mu_g = \alpha E + \beta EE + \gamma EEE + \ldots \quad (1)$$

$$P = P_O + \chi^{(1)}E + \chi^2 EE + \chi^{(3)}EEE + \ldots \quad (2)$$

Light waves passing through an array of molecules can interact with them to produce new waves. This interaction may be interpreted as resulting from a modulation in refractive index or alternatively as nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental $\omega$ and the second harmonic $2\omega$ are identical so that dispersion may be overcome.

The term "phase matching" as employed herein refers to an effect in a nonlinear optical medium in which a harmonic wave is propagated with the same effective refractive index as the incident fundamental light wave. Efficient second harmonic generation requires a nonlinear optical medium to possess propagation directions in which optical medium birefringence cancels the natural dispersion, i.e., the optical transmission of fundamental and second harmonic frequencies in phase matched in the medium. The phase matching can provide a high conversion percentage of the incident light to the second harmonic wave.

For the general case of parametric wave mixing, the phase matching condition is expressed by the relationship:

$$n_1\omega_1 + n_2\omega_2 = n_3\omega_3$$

where $n_1$ and $n_2$ are the indexes of refraction for the incident fundamental radiation, $n_3$ is the inde of refraction for the created radiation, $\omega_1$ and $\omega_2$ are the frequencies of the incident fundamental radiation and $\omega_3$ is the frequency of the created radiation. More particularly, for second harmonic generation, wherein $\omega_1$ and $\omega_2$ ae the ame frequency $\omega$, and $\omega_3$ is the created second harmonic frequency, $2\omega$, the phase matching condition is expressed by the relationship:

$$n_\omega = n_{2\omega}$$

where $n_\omega$ and $n_{2\omega}$ are indexes of refraction for the incident fundamental and created second harmonic light waves, respectively. More detailed theoretical aspects are described in "Quantum Electronics" by A. Yariv, chapters 16-17 (Wiley and Sons, New York, 1975).

A present invention nonlinear optical medium typically is optically transparent and exhibits hyperpolarization tensor properties such as second harmonic and third harmonic generation, and the linear electrooptic (Pockels) effect. For second harmonic generation, the bulk phase of the physical alloy of guest organic compound component and host liquid crystalline polymer whether liquid or solid does not possess a real or orientational average inversion center. The substrate is a macroscopic noncentrosymmetric structure.

Harmonic generation measurements relative to quartz can be performed to establish the value of second order and third order nonlinear susceptibility of the optically clear organic media.

In the case of macroscopic nonlinear optical media that are composed of noncentrosymmetric sites on the molecular and domain level, the macroscopic second order nonlinear optical response $\chi^{(2)}$ is comprised of the corresponding molecular nonlinear optical respone $\beta$. In the rigid lattice gas approximation, the macroscopic susceptibility $\chi^{(2)}$ is expressed by the following relationship:

$$\chi_{ijk}(-\omega_3; \omega_1,\omega_2) = Nf^{\omega_3}f^{\omega_2}f^{\omega_1}<\beta_{ijk}(-\omega_3; \omega_1,\omega_2)>$$

wherein N is the number of sites per unit volume, f represent small local field correlations, $\beta_{ijk}$ is averaged over the unit cell, $\omega_3$ is the frequency of the created optical wave, and $\omega_1$ and $\omega_2$ are the frequencies of the incident fundamental optical waves.

These theoretical considerations are elaborated by Garito et al in chapter 1 of the ACS Symposium Series 233 (1983); and by Lipscomb et al in J. Chem., Phys., 75, 1509 (1981), incorporated by reference. See also Lalama et al, Phys. Rev., A20, 1179 (1979); and Garito et al, Mol., Cryst. and Liq. Cryst., 106, 219 (1984); incorporafted by reference. EXTERNAL FIELD INDUCED GUEST/HOST MOLECULAR ORIENTATION The term "external field" as employed herein refers to an electric, magnetic or mechanical stress field which is applied to a substrate of mobile organic molecules, to induce dipolar alignment of the molecules parallel to the field.

Liquid crystals (including polymeric liquid crystals) may be aligned by the application of an external field to a matrix of liquid crystal molecules. The degree of orientation is determined by the orientational order parameter. For both nematic and smectic mesophases, the parameter is defined in terms of a director which is a vector parallel to the molecular long axis (and perpendicular to the plane of molecular layering in the case of the smectic mesophase).

If theta is defined as the angle between the director and a chosen axis, then the orientational order parameter is defined as the average over all molecules of the second Legendre polynominal. The parameter ranges from −0.5 to 1.0 (1.0 corresponds to perfect uniaxial alignment along a given axis. 0.0 corresponds to random orientation, and −0.5 corresponds to random orientation confined in a plane perpendicular to a given axis).

The order parameter thus defined does not distinguish between parallel and antiparallel alignment. Thus, a sample of asymmetric rod-like molecules would have an order parameter of 1.0 for both the case in which the molecules are colinear and all pointed in the same direction, and the case in which the molecules are colinear and form antiparallel pairs.

The application of an orienting external field to an array of nematic liquid crystal molecules results in an order parameter of approximately 0.65. Deviations from ideal order are due to nematic fluctuations on a micron length scale which accommodate characteristic defects. These fluctuations may be dynamic for small molecule liquid crystals or frozen for polymeric liquid crystals. In either case, nematic fluctuations scatter light so that aligned samples appear to be hazy (particularly in a thick sample).

Smectic liquid crystals may be aligned by application of an orienting external field, with a resulting order parameter of or exceeding 0.9. Unlike the nematic phase, characteristic defects are removed upon aligning the smectic phase and thereby forming a single liquid crystal phase. Such phases are known as monodomains and, because there are no defects, are optically clear.

For both the nematic and smectic mesophases, application of a DC electric field produces orientation by torque due to the interaction of the applied electric field and the net molecular dipole moment. The molecular dipole moment is due to both the permanent dipole moment (i.e., the separation of fixed positive and negative charge) and the induced dipole moment (i.e., the separation of positive and negative charge by the applied field).

The torque which results by the application of a DC electric field normally would only produce very slight alignment even for high dipolar and polarizable molecules at room temperature. The alignment torque is negligible in comparison with the disordering effect of thermally induced rotation (i.e., the Boltzman distribution of rotational eigenstates at room temperature). However, due to the unique associations developed by liquid crystalline molecules through intermolecular forces, long range orientational order on a micron length scale is present. Under these conditions, bulk orientation of the sample by application of aligning fields exceeding a few volts/cm can produce the degree of alignment indicated above.

Application of an AC electric field also can induce bulk alignment. In this case, orienting torque occurs solely due to the interaction of the applied AC field and the induced dipole moment. Typically, AC field strengths exceeding 1 kV/cm at a frequency of or exceeding 1 KHz are employed for the nematic phase. At these frequencies, rotational motion of aligned nematic regions is not sufficient to follow the field. As a direct result, torque due to the interaction of the applied field and any permanent dipole moment over time averages to zero. However, electronically induced polarization is a very rapid process so that the induced dipole moment changes direction depending upon the direction of the applied field resulting in a net torque.

Application of a magnetic field also can effect alignment. Organic molecules do not possess a permanent magnetic dipole moment. In a manner analogous to AC electric field, a magnetic field can induce a net magnetic dipole moment. Torque results from the interaction of the induced dipole moment and the external magnetic field. Magnetic field strengths exceeding 10 Kgauss are sufficient to induce alignment for a nematic phase.

Alignment of nematics by electric or magnetic fields are accomplished simply by application of the field to the nematic material. Alignment of the smetic phase is more difficult due to a higher viscosity which decreases rotational freedom. Formation of aligned smectic monodomains can be achieved by first orienting a material in the nematic phase, and then cooling the material into the smectic phase while maintaining the aligning field. For materials which have only smectic and isotropic phase and which lack a nematic phase, alignment can be accomplished in the smectic phase at an elevated temperature near the smectic to isotropic transition temperature, e.g., sufficiently close to the transition temperature so that the medium may contain smectic domains in an isotropic fluid.

Mechanical stress induced alignment is applicable to both the smectic and nematic mesophases. Strong aligning mechanical stress propagates throughout a solid liquid crystalline material due to the natural tendency of these media to self align. Specific mechanical stress methods include stretching a thin film, or coating a liquid crystalline surface with an aligning polymer such as nylon. Physical methods (e.g., stretching) rely upon the rigid and geometrically asymmetric character of certain liquid crystalline molecules to induce bulk orientation. Chemical methods (e.g., coating the surface with an aligning polyer), rely upon strong intermolecular interactions to induce surface orientation.

All of the methods described above to produce oriented materials apply to both guest molecules such as p-dihexylaminonitrostilbene and host liquid crystalline polymers such as poly[(4-nitrobiphenyloxyhexyloxymethyl)ethylene terephthalate]. For polymers which possess a glass transition, the aligned liquid crystalline phase can be frozen by rapid cooling below the glass transition temperature.

The application of an AC electric field to a present invention nonlinear optical medium in the melt phase typically will result in a medium which exhibits third order nonlinear optical susceptibility $\chi^{(3)}$. In the case of a nonlinear optical medium in which the guest component and the polymer component both exhibit second order nonlinear optical susceptibility $\beta$, the application of a strong DC electric field will result in a medium which exhibits second order nonlinear optical susceptibility $\chi^{(2)}$. These effects are demonstrated in Example XIV.

Publications relating to external field-induced liquid crystal molecular orientation include The Physics of Liquid Crystals, P. G. deGennes, p. 95–97, Oxford University Press, 1974; J. Stamatoff et al, "X-Ray Diffraction Intensities of a Smectic-A Liquid Crystal", Phys. Rev. Letters, 44, 1509–1512, 1980; J. S. Patel et al, "A Reliable Method of Alignment for Smectic Liquid Crystals", Ferroelectrics, 59, 137–144, 1984; J. Cognard, "Alignment of Nematic Liquid Crystals and Their Mixtures", Mol. Cryst. Liq. Cryst.: Suppl., 1982; incorporated herein by reference.

The following examples are further illustrative of the present invention. The components and specific ingredients are presented as being typical, and various modifications can be derived in view of the foregoing disclosure within the scope of the invention.

EXAMPLE I

This Example illustrates the preparation of poly[6-(4-nitrobiphenyloxy)hexyl methacrylate].

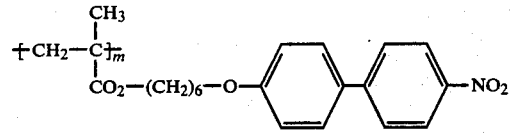

A. 4-Hydroxy-4'-nitrobiphenyl (1) 4-benzopyloxybiphenyl

To 500 ml of pyridine in a 1000 ml three necked flask is added 170 g of 4-hydroxybiphenyl. The mixture is cooled to 10° C., and 155 g of benzoyl chloride is added dropwise while keeping the mixtue temperature below 20° C. After complete addition, the mixtureis heated gradually to reflux and maintained at this temperature for 30 minutes. The reaction mixture is then cooled to room temperature.

The solidified product subsequently is admixed with 250 ml HCl and 250 ml water, then additional HCl and water are added and the slurry is mixed thoroughly in a blender. The particulate solid is filtered, washed with water to a neutral pH, and air-dired overnight. The crude product is recrystallized from n-butanol, mp 149°–150° C.

(2) 4-benzoyloxy-4'-nitrobiphenyl 4-benzoyloxybiphenol (40 g) is mixed with 310 ml of glacial acetic acid and heated to 85° C. Fuming nitric acid (100 ml) is added slowly while maintaining the reaction medium temperature between 85°–90° C. After complete addition, the reaction is cooled to room temperature.

The resultant solid is filtered and washed with water and methanol. The crude product is recrystallized from glacial acetic acid, mp 211°–214° C.

(3) 4-Hydroxy-4'-nitrobiphenyl

4-Benzoxyloxy-4'-nitrobiphenyl (60 g) is mixed with 300 ml of ethanol and heated to reflux. A solution of 40 g KOH in 100 ml of water is added dropwise at reflux. After complete addition, the mixture is refluxed 30 minutes and cooled overnight. The resultant blue crystalline potassium salt is filtered and dried.

The dried salt is dissolved in a minimum amount of boiling water, and a 50/50 HCl/water solution is added until an acidic pH is obtained. The crude yellow product is filtered and washed with water until neutral, and then recrystallized from ethanol, mp 203°–204° C.

B. 4-(6-Hydroxyphexyloxy)-4'-nitrobiphenyl

To 400 ml of ethanol is added 21.5 g of 4-hydroxy-4'-nitrobiphenyl and the mixture is heated to reflux. A solution of 7.1 g of KOH in 30 ml of water is added dropwise at reflux temperature. After complete addition, a 21.7 g quantity of 6-bromohexanol is added, and the reaction medium is refluxed about 15 hours. Then the reaction medium is cooled and the ethanol is removed in a rotary evaporator.

The solid residue is slurried with water in a blender, and the particulate solid is filtered, washed with water, and air dried. The crude product is recrystallized from ethanol, mp 117°–119° C.

C. 4-(6-Methacryloxyhexyloxy)-4'-nitrobiphenyl 4-(6-Hydroxyhexyloxy)-4'-nitrobiphenyl (22 g) is dissolved in 500 ml of dry dioxane and heated to 45° C. A 14 g quantity of triethylamine is added, then a solution of 10.5 g of methacryloyl chloride in an equal volume of dioxane is added dropwise while maintaining the reaction medium temperature at 45° C.

The reaction medium is stirred at 45° C. for about 24 hours. The dioxane then is removed under vacuum, and the solid residue is slurried in water in a blender. The particulate solid is filtered, washed with water, and air dried. The crude monomer product is recrystallized from ethanol, mp 53°–56° C.

D. Poly[6-(4-nitrobiphenyloxy)hexyl methacrylate]

The monomer (2g) is dissolved in 20 ml of degassed benzene in a reactor, anda 1 mole percent of azodiisobutyronitrile is added to the reaction medium. The reactor is heafted at 60° C. for 4 days. During this period, polymer product separates from the reaction medium. After the polymerization is completed, the polymer is recovered and slurried with methanol in a blender. The solid polymer is filtered, washed with methanol, and vacuum dried.

EXAMPLE II

This example illustrates the preparation of a side chain liquid crystalline polysiloxane polymer.

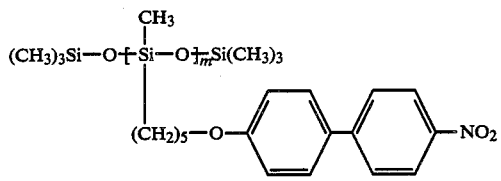

A. 4-(4-Pentenoxy)-4'-nitrobiphenyl

To 400 ml ethanol is added 21.5 g of 4-hydroxy-4'-nitrobiphenyl, and the mixture is heated to reflux. A solution of 7.1 g KOH in 30 ml of water is added dropwise at reflux temperatures. After complete addition, 18 g of 5-bromo-1-pentene is added and the reaction medium is heated at reflux temperarure for about 15 hours. Ethanol is removed under vacuum from the cooled mixture, and the solid residue is slurried with water in a blender, filtered, washed with water, and air dried. The product then is recrystallized from 90/10 hexane/toluene, mp 74°–76° C.

B. Liquid crystalline polymer formation 4-(4-Penteneoxy)-4'-nitrobiphenyl and poly(methyl hydrogen siloxane) (average M.W., 500-2000) are dissolved in dry toluene, in quantities which provide a 10 mole percent excess of the biphenyl reactant. To this reaction medium is added 1-2 drops of chloroplatinic acid catalyst (5 percent weight/volume in isopropanol).

After heating at 60° C. for about 15 hours, the reaction mixture is poured into methanol to separate a precipitate of solid polymer. The solid polymer is recovered, and purified by dissolving the polymer in chloroform, filtering the solution through diatomaceous earth, and precipitating the polymer from solution with methanol.

EXAMPLE III

This example illustrates the preparation of a side chain liquid crytalline polyoxyalkylene polymer.

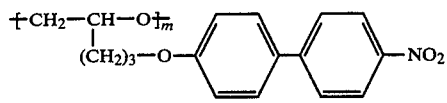

A. 4-(4,5-Epoxypentoxy)-4'-nitrobiphenyl

To 250 ml of methylene chloride is added 28.3 g of 4-(4-penteneoxy)-4'-nitrobiphenyl. The solution is cooled to 0° C., and 18 g of meta-chloroperbenzoic acid is added slowly. The mixture is stirred at 0° C. for 24 hours, and allowed to warm to room temperature.

The solution is filtered, and the filtrate is washed with dilute sodium carbonate, water, and dried over magnesium sulfate. The solvent is removed in a rotary evaporator at room temperature to yield the product as a solid residue.

B. Liquid Crystalline Polymer Formation 4-(4,5-Epoxypentoxy)-4'-nitrobiphenyl (2 g) is dissolved in anhydrous benzene, and heated at 40° C. for 15 hours with boron trifluoride-etherate as a catalyst.

The resultant polyoxypentylene polymer is recovered by precipitation from solution with methanol, and vacuum dried.

The polymer is purified by precipitation from a benzene solution with methanol.

EXAMPLE IV

This Example illustrates the preparation of poly[(4-nitrobiphenyloxyhexyloxymethyl)ethylene terephthalate].

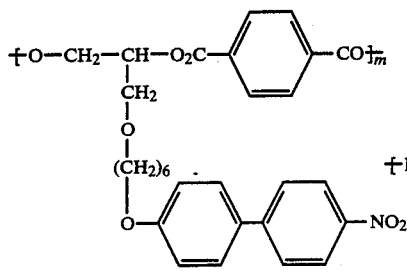

To a 300 ml three necked flask, fitted with an argon inlet, mechanical stirrer, and distillation head/condenser, is added 97 g (0.5M) of dimethyl terephthalate, 194.5 g (0.5M) of 4-nitrobiphenyloxyhexyloxymethyl ethylene glycol, 0.14 g of zinc acetate, and 0.03 g of antimony trioxide. The system is evacuated, and then purged three times with argon. The reaction mixture is heated at 160° C./30 minutes, 180° C./60 minutes, 200° C./60 minutes, and 220° C./30 minutes, during which time methanolis distilled off.

The temperature is then raised to 250° C. Over a 30 minute period the pressure is slowly reduced to 1 mm Hg, and then held at 0.5 mm for approximately 30 minutes. Subsequently, the vacuum is released under argon, and the flask is cooled. The polymer product is ground (liquid nitrogen), and air dried.

EXAMPLE V

This Example illustrates the preparation of poly[(4-nitrostilbeneoxyhexyloxymethyl)ethylene terephthalate].

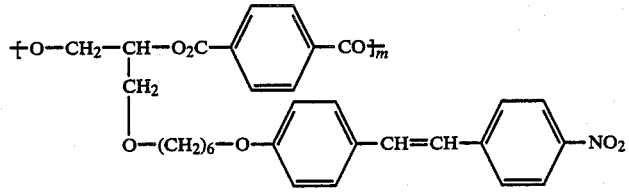

The procedure of Example IV is employed, except that dimethyl terephthalate is condensed with 4-nitrostilbeneoxyhexyloxymethyl ethylene glycol to produce the polymer product.

EXAMPLE VI

This Example illustrates the preparation of poly(ethylene 6-[(4-nitrobiphenyloxy)hexyloxy]terephthalamide).

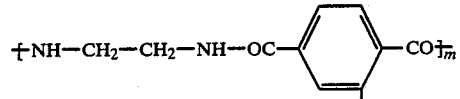
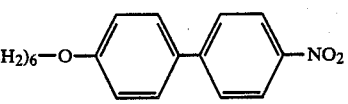

A solution of 3 g (0.05M) of ethylenediamine, 10.6 g (0.1M) of sodium carbonate, and 2 g of sodium lauryl sulfate are dissolved in 300 ml of water in a blender jar. The blending is commenced and a second solution of 25.8 g of 6-[(4-nitrobiphenyloxy)hexyloxy]terephthaloyl chloride in 300 ml of methylene dichloride is added over a period of 5 minutes. Stirring is continued an additional 15 minutes, and subsequently the reaction medium is acidified. Ethanol is added to precipitate the polymer. The polymer is filtered, washed with water, and dried.

EXAMPLE VII

This Example illustrates the preparation of poly(ethylene 6-[(4-nitrostilbeneoxy)hexyloxy]terephthalamide.

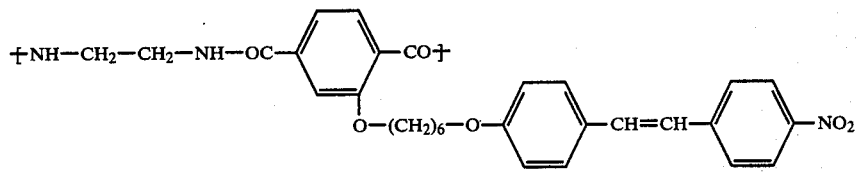

The procedure of Example VI is employed, except that ethylenediamine is condensed with 6-[(4-nitrostilbeneoxy)hexyloxy]terephthaloyl chloride to produce the polymer product.

EXAMPLE VIII

This Example illustrates the preparation of 13,13-diamino-14,14-dicyano-4,5,9,10-tetrahydropyrenoquinodimethane.

Ten grams of 13,13,14,14-tetracyano-4,5,9,10-tetrahydropyrenoquinodimethane and 2 liters of tetrahydrofuran are placed in a three-necked three liter flask equipped with a mechanical stirrer, a nitrogen inlet, a drying tube and a gas-inlet connected to an anhydrous ammonia gas tank. Ammonia gas is bubbled through the stirred solution for three days at room temperature. The crude product in precipitate form is filtered from the reaction mixture, washed with distilled water, and recrystallized from DMF-water to yield high purity 13,13-diamino-14,14-dicyano-4,5,9,10-tetrahydropyrenoquinodimethane product.

EXAMPLE IX

This Example illustrates the preparation of 13,13-di(n-hexadecylamino)-14,14-dicyano-4,5,9,10-tetrahydropyrenoquinodimethane.

A three-necked three-liter flask equipped with a mechanical stirrer, a nitrogen inlet, a drying tube, and an addition funnel is charged with 10 grams (0.03 moles) of 13,13,14,14-tetracyano-4,5,9,10-tetrahydropyrenoquinodimethane and two liters of tetrahydrofuran. Twenty-nine grams (0.12 moles) of n-hexadecylamine in 100 ml of tetrahydrofuran is added dropwise into the flask, and the resulting mixture is stirred for three days at room temperature. The resulting THF solution is concentrated on a rotary evaporator.

The crude product in precipitate form is separated by filtration, washed with distilled water, neutralized with 10% solution of ammonium hydroxide, washed with water, and then recrystallized from N,N-dimethylformamide-water to yield 13,13-di(n-hexadecylamino)-14,14-dicyano-4,5,9,10-tetrahydropyrenoquinodimethane.

If the compound is aligned in a melt-phase in a DC field by applying about 15 K. volts/cm, and cooled slowly to freeze the aligned molecular structure in the DC field, the aligned molecular substrate is optically transparent and can exhibit a nonlinear optical susceptibility $\beta$ of about $1000 \times 10^{-30}$ esu, a $\chi^{(2)}$ of about $3.3 \times 10^{-6}$ esu, and a Miller's delta of about 4 square meters/coulomb.

EXAMPLE X

This Example illustrates the preparation of 13,13-diamino-14,14-dicyanodiphenoquinodimethane.

Following the procedure of Example VIII, 13,13-diamino-14,14-dicyanodiphenoquinodimethane is prepared by ammonia treating a tetrahydrofuran solution containing 10 grams of 13,13,14,14-tetracyanodiphenoquinodimethane.

DC induced second harmonic generation can provide a nonlinear second order optical susceptibility $\chi^{(2)}$ of about $3 \times 10^{-6}$ esu in a transparent medium of the product.

In a product medium with a centrosymmetric molecular configuration, the susceptibility $\chi^{(3)}$ is about $1 \times 10^{-9}$ esu.

EXAMPLE XI

This Example illustrates the preparation of 13,13-di(n-hexyldecylamino)-14,14-dicyanodiphenoquinodimethane.

Following the procedure of Example IX, 13,13-di(n-hexadecylamino)-14,14-dicyanodiphenoquinodimethane is prepared by employing a tetrahydrofuran solution containing ten grams of 13,13,14,14-tetracyanodiphenoquinodimethane and thirty-two grams of n-hexadecylamine. The second order nonlinear susceptibility $\chi^{(2)}$ is about $3 \times 10^{-6}$ esu after alignment of molecules in a DC field.

EXAMPLE XII

This Example illustrates the preparation of 11,11-di(n-butylamino)-12,12-dicyano-2,6-naphthoquinodimethane.

A three-necked three-liter flask equipped with a mechanical stirrer, a nitrogen inlet, a drying tube, and an addition funnel is charged with 10 grams (0.03 moles) of 11,11,12,12-tetracyano-2,6-naphthoquinodimethane and two liters of tetrahydrofuran. Twenty-nine grams (0.12 moles) of n-butylamine in 100 ml of tetrahydrofuran is added dropwise into the flask, and the resulting mixture is stirred for three days at room temperature. The resulting THF solution is concentrated on a rotary evaporator.

The crude product in precipitate form is separated by filtration, washed with distilled water, neutralized with 10% solution of ammonium hydroxide, washed with water, and then recrystallized from DMF-water to yield 11,11-di(n-butylamino)-12,12-dicyanonaphthoquinodimethane.

If the compound is aligned in a melt-phase in a DC field by applying about 15 K. volts/cm, and cooled slowly to freeze the aligned molecular structure in the DC field, the aligned molecular optical susceptibility $\beta$ of about $350 \times 10^{-30}$ esu, a $\chi^{(2)}$ of about $1.5 \times 10^{-6}$ esu, and a Miller's delta of about 4 square meters/coulomb.

EXAMPLE XIII

This Example illustrates the preparation of 11,11-di(n-hexyldecylamino)-12,12-dicyano-2,6-naphthoquinodimethane.

Following the procedure of Example XII, 11,11-di(n-hexadecylamino)-12,12-dicyano-2,6-naphthoquinodimethane is prepared by employing a tetrahydrofuran solution containing ten grams of 11,11,12,12-tetracyano-2,6-naphthoquinodimethane and thirty-two grams of n-butylamine. The second order nonlinear optical susceptibility $\chi^{(2)}$ is about $1 \times 10^{-6}$ esu after alignment of molecules in a DC field.

In a transparent solid medium in which the molecules are randomly distributed, the product medium can exhibit a nonlinear optical susceptibility $\chi^{(3)}$ of about $1 \times 10^{-10}$ esu.

EXAMPLE XIV

This Example illustrates a poling procedure for producing a second order nonlinear optical medium of a guest organic compound and a host side chain liquid crystalline polymer in accordance with the present invention.

A. Poling Cell Construction

A poling cell is constructed from electrically conductive glass plates, such as Donnelly Mirror PD5007-7. The glass plates are washed with sulfuric acid, isopropanol, 1-dodecanol, and isopropanol, with a distilled water rinse between each washing step.

The poling cell is a sandwich type cell in which the conductive glass surfaces are in facing proximity and are separated by a polyimide film of approximately 25 micrometer thickness. A thin layer of epoxy adhesive is applied on the surfaces of the polyimide film to hold the glass plates.

After the epoxy is completely cured, the cell is washed with isopropanol and rinsed with distilled water. After drying, the cell is stored in a dry box.

B. Filling The Poling Cell

Poly[6-(4-nitrobiphenyloxy)hexyl methacrylate] doped with 1.0% by weight of 13,13-di(n-hexadecylamino)-14,14-dicyano-4,5,9,10-tetrahydropyrenoquinodimethane is placed in a vacuum oven and maintained in a melt phase at a temperature of about 120° C. for about 4 hours to eliminate entrained air bubbles from the guest/host melt.

The melt is introduced into the space between the glass plates by charging a drop of the melt to one of the openings of the poling cell space and placing the cell assembly in a vacuum oven maintained at a temperature approximately 10° C. above the clearing temperature of the liquid crystalline polymer. The cell space fills gradually by capillary action. The space filling period is about 4 hours for a 0.5 cm long space. The melt in the filled cell is bubble-free.

C. Electric Field Induced Orientation

Two lead wires are attached to each of the conductive glass surfaces using electrically conductive epoxy adhesive. The poling assembly is placed in a microscope hot stage (Mettler FP-82 with FP-80 Central Processor), and the sample is observed with a polarizing microscope (Leitz Ortholux Pol) for alignment.

The microscope is switched into a photodiode (Mettler Photometer No. 17517) to record the change of light intensity upon application of an electric field. The two lead wires are connected to an AC voltage amplifier (Electro-Optic Developments LA10A), which amplifies the voltage signal from a signal generator (Hewlett-Packard No. 3310B).

The poling cell first is heated to 85° C. to bring the liquid crystalline polymer component to the isotropic phase. The assembly then is cooled at a rate of 0.2° C./min. until it reaches 64° C. At this temperature, the photodiode signal registers an abrupt increase which indicates that the melt has undergone a transition into a liquid crystalline phase. The temperature is further lowered by 2° C. and then maintained at this temperature.

The AC voltage source is set at 500 V, and the frequency is set at 2000 Hz. The power to the poling cell is turned on to apply an electric field across the doped polymer sample. The field strength is calculated to be approximately $2 \times 10^5$ V/cm. About three seconds after the electric field is applied, the photodiode signal drops close to the baseline, indicating that orientation development induced by the electric field is completed. At this point, the cooling is resumed until the temperature reaches 35° C., and the poling assembly is disconnected from the power source.

When the poling assembly is removed from the microscope hot stage, by visual observation the melt phase polymer in the cell space is transparent. This is an indication that the molecular orientation is uniform and homogeneous throughout the sample. Orientation of the sample is further ascertained utilizing a wide angle X-ray diffraction technique, and the Herman's orientation factor of the sample is approximately 0.9.

D. High Field Poling For Symmetry Control

The oriented doped polymer sample is subjected further to a higher electric field to develop a noncentrosymmetric orientation of nonlinear optical moieties which are a part of the side chains of the polymer, and orientation of the guest molecules.

The poling cell assembly is heated to 30° C., which is approximately 5° C. below the glass transition temperature of the polymer. Then the lead wires of the poling assembly are connected to a DC voltage source (Kepco OPS-3500) and the voltage is turned up slowly until it reaches 2000 V. At this point, the electric field strength across the sample is about $8 \times 10^5$ V/cm. The sample is maintained at this field strength level for 24 hours, and then the voltage source is disconnected. A noncentrosymmetrically oriented medium of host liquid crystalline polymer and guest compound is obtained when the cell sample is cooled.

The noncentrosymmetry of the sample is determined from the wide angle X-ray diffraction measurement and the thermally stimulated electrical discharge measurement. The Hermann's orientation function from the X-ray measurement is approximately 0.9.

From the measurements, there is an indication that a major proportion of the nonlinear optical moieties are aligned parallel to the electric field direction, and the rest are oriented antiparallel to the electric field direction.

EXAMPLE XV

This Example illustrates the use of 11,11-di(n-hexyldecylamino)-12,12-dicyano-2,6-naphthoquinodimethane as a guest compound in a host polymer substrate.

One gram of 11,11-di(n-hexadecylamino)-12,12-dicyano-2,6-naphthoquinodimethane and 99 grams of poly[(4-nitrostilbeneoxyhexyloxymethyl)ethylene terephthalate] are dissolved in 400 ml of methylene chloride. A film (2 mil) is cast from this solution on a glass plate coated with indium-tin oxide. Another glass plate coated with indium-tin oxide is placed on the film, and then the film is heated to about 150° C. A DC field is applied to align the molecules, and the film is cooled slowly in the applied field to yield an aligned guest/host alloy which can have a second order nonlinear susceptibility $\chi^{(2)}$ of about $2 \times 10^{-8}$ esu as measured at 1.91 $\mu$m excitation wavelength.

A $\chi^{(2)}$ of greater than $2 \times 10^{-8}$ esu can be obtained if 20 grams of 4-nitrostilbeneoxyhexyloxymethyl ethylene glycol is employed in place of the guest naphthoquinodimethane compound.

EXAMPLE XVI

This Example illustrates the use of 13,13-di(n-hexyldecylamino)-14,14-dicyano-4,5,9,10-tetrahydropyrenoquinodimethane as a guest compound in a host polymer substrate.

One gram of 13,13-di(n-hexadecylamino)-14,14-dicyano-4,5,9,10-tetrahydropyrenoquinodimethane and 99 grams of poly(ethylene 6-[(4-nitrobiphenyloxy)hexyloxy]terephthalamide) are dissolved in 400 ml of methylene chloride. A film (2 mil) is cast from this solution on a glass plate coated with indium-tin oxide. Another glass plate coated with indium-tin oxide is placed on the film, and then the film is heated to about 150° C. A DC field is applied to align the molecules, and the film is cooled slowly in the applied field to yield an aligned guest/host alloy which can have a second order nonlinear susceptibility $\chi^{(2)}$ of about $2 \times 10^{-8}$ esu as measured at 1.91 $\mu$m excitation wavelength.

What is claimed is:

1. A nonlinear optical medium in the form of a transparent solid comprising (1) a host thermotropic liquid crystalline polymer component which is characterized by a recurring monomeric unit corresponding to the formula:

where P is a polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 μm excitation wavelength, and where the pendant mesogens comprise at least about 10 weight percent of the polymer, and the polymer has a glass transition temperature above about 40° C.; and (2) a guest organic compound component which has a molecular weight less than about 1000, and which exhibits a second order nonlinear optical susceptibility $\beta$ of at least about $5 \times 10^{-30}$ esu as measured at 1.91 μm excitation wavelength; wherein the optical medium is characterized by an external field-induced orientation of aligned molecules.

2. A nonlinear optical medium in the form of a transparent solid comprising (1) a host thermotropic liquid crystalline polymer component which is characterized by a recurring monomeric unit corresponding to the formula:

where P is a polymer main chain unit, S is a flexible spacer group having a linear chain length of between about 0-20 atoms, M' is a pendant mesogen which exhibits a third order nonlinear optical susceptibility $\gamma$ of at least about $1 \times 10^{-36}$ esu as measured at 1.91 μm excitation wavelength, and where the pendant mesogens comprise at least about 10 weight percent of the polymer, and the polymer has a glass transition temperature above about 40° C.; and (2) a guest organic compound component which has a molecular weight less than about 1000, and which exhibits a third order nonlinear optical susceptibility $\gamma$ of at least $1 \times 10^{-36}$ esu as measured at 1.91 μm excitation wavelength; wherein the optical medium is characterized by an external field-induced orientation of aligned molecules.

3. A nonlinear optical medium in the form of a transparent solid comprising (1) a host thermotropic liquid crystalline polymer component which is characterized by a recurring monomeric unit corresponding to the formula:

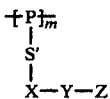

where P is a polymer main chain unit; m is an integer of at least 3; S' is a flexible spacer group having a linear chain length of between about 1-25 atoms; X is —NR—, —O— or —S—; R is hydrogen or a $C_1$-$C_4$ alkyl group; Y is

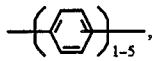

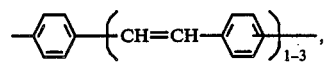

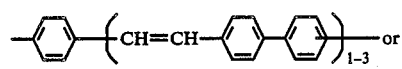

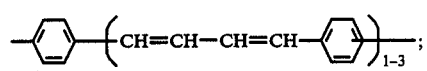

and Z is an electron-donating group or an electron-withdrawing group; and (2) an organic compound component corresponding to the formula:

K—X—Y—Z where K is hydrogen or an organic radical; X, Y and Z correspond to groups as defined above; and the organic compound component has a molecular weight less than about 1000.

4. A nonlinear optical medium in the form of a transparent solid comprising (1) a host thermotropic liquid crystalline polymer component which is characterized by a recurring monomeric unit corresponding to the formula:

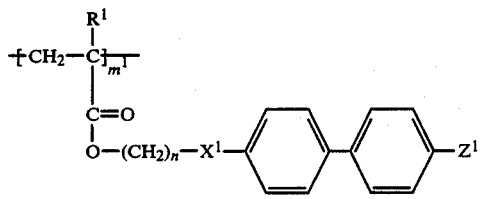

where $m^1$ is an integer of at least 5; n is an integer between about 4-20; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

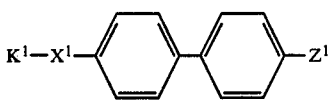

where $K^1$ is hydrogen or an organic radical containing between about 1-20 carbon atoms; and $X^1$ and $Z^1$ are groups as defined above.

5. A nonlinear optical medium in the form of a transparent solid comprising (1) a host thermotropic liquid crystalline polymer component which is characterized by a recurring monomeric unit corresponding to the formula:

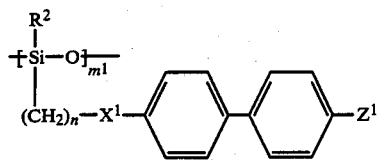

where $R^2$ is a $C_1$-$C_{10}$ hydrocarbyl group; $m^1$ is an integer of at least 5; n is an integer between about 4-20; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

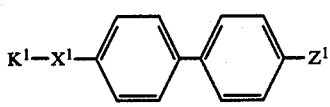

where $K^1$ is hydrogen or an organic radical containing between about 1-20 carbon atoms; and $X^1$ and $Z^1$ are groups as defined above.

6. A nonlinear optical medium in the form of a transparent solid comprising (1) a host thermotropic liquid crystalline polymer component which is characterized by a recurring monomeric unit corresponding to the formula:

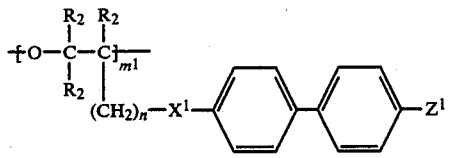

where $R^2$ is hydrogen or a $C_1$-$C_4$ alkyl group; $m^1$ is an integer of at least 5; n is an integer between about 4-20; $X^1$ is —$NR^1$, —O— or —S—; $R^1$ is hydrogen or methyl; and $Z^1$ is —$NO_2$, —CN or —$CF_3$; and (2) an organic compound component corresponding to the formula:

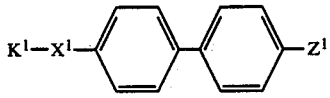

where $K^1$ is hydrogen or an organic radical containing between about 1-20 carbon atoms; and $X^1$ and $Z^1$ are groups as defined above.

7. A nonlinear optical medium in the form of a transparent solid comprising (1) a host thermotropic liquid crystalline polymer component which is characterized by a recurring monomeric unit corresponding to the formula:

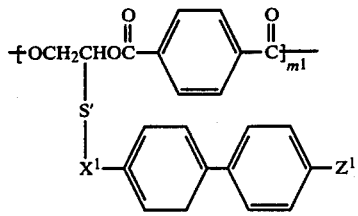

where $m^1$ is an integer of at least 5; S' is a flexible spacer group having a linear chain length of between about 1-25 atoms; $X^1$ is —$NR^1$, —O— or —S—; $R^1$ is hydrogen or methyl; and $Z^1$ is —$NO_2$, —CN or —$CF_3$; and (2) an organic compound component corresponding to the formula:

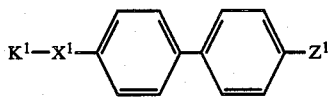

where $K^1$ is hydrogen or an organic radical containing between about 1-20 carbon atoms; and $X^1$ and $Z^1$ are groups as defined above.

8. A nonlinear optical medium in the form of a transparent solid comprising (1) a host thermotropic liquid crystalline polymer component which is characterized by a recurring monomeric unit corresponding to the formula:

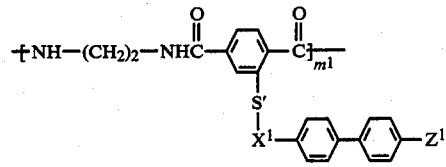

where $m^1$ is an integer of at least 5; S' is a flexible spacer group having a linear chain length of between about 1-25 atoms; $X^1$ is —$NR^1$—, —O— or —S—; $R^1$ is hydrogen or methyl; and $Z^1$ is —$NO_2$, —CN or —$CF_3$; and (2) an organic compound component corresponding to the formula:

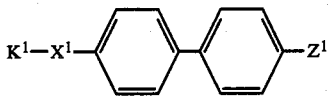

where $K^1$ is hydrogen or an organic radical containing between about 1-20 carbon atoms; and $X^1$ and $Z^1$ are groups as defined above.

9. A light switch or light modulator device with an organic nonlinear optical component consisting of a transparent solid medium comprising a thermoplastic composition which is a blend of constituents comprising (1) a host thermotropic liquid crystalline polymer which is characterized by a recurring monomeric unit corresponding to the formula:

where P is a polymer main chain unit, S is a flexible spacer group having a linear chain length of between about 0-20 atoms, M is a pendant mesogen which exhibits a second order nonlinear optical susceptibility $\beta$ of at least about $5 \times 10^{-30}$ esu as measured at 1.91 $\mu$m excitation wavelength, and where the pendant mesogens comprise at least about 10 weight percent of the polymer, and the polymer has a glass transition temperature above about 40° C.; and (2) a guest organic compound which has a molecular weight less than about 1000, and which exhibits a second order nonlinear optical susceptibility $\beta$ of at least about $5 \times 10^{-30}$ esu as measured at 1.91 $\mu$m excitation wavelength; wherein the optical medium is characterized by an external field-induced orientation of aligned molecules.

10. A light switch or light modulator device in accordance with claim 9 wherein the guest organic compound of the composition blend comprises about 5-30 weight percent of the total weight of constituents in the blend.

11. A light switch or light modulator device in accordance with claim 9 wherein the host thermotropic liquid crystalline polymer is characterized by a recurring monomeric unit corresponding to the formula:

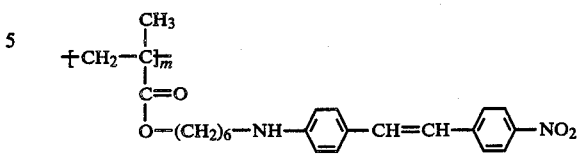

where m is an integer of at least 3.

* * * * *